United States Patent [19]
Yamagata et al.

[11] Patent Number: 5,920,658
[45] Date of Patent: Jul. 6, 1999

[54] EFFICIENT IMAGE POSITION CORRECTION SYSTEM AND METHOD

[75] Inventors: Hideaki Yamagata, Midori-ku; Toshio Miyazawa, Miyamae-ku, both of Japan

[73] Assignee: Ricoh Company Ltd., Japan

[21] Appl. No.: 08/814,706

[22] Filed: Mar. 11, 1997

[30] Foreign Application Priority Data

Mar. 12, 1996 [JP] Japan .................................. 8-054308

[51] Int. Cl.⁶ .................................................. G06K 9/00
[52] U.S. Cl. .......................................... 382/293; 382/181
[58] Field of Search .................................. 382/289, 291, 382/292, 293, 296, 106, 107, 151, 152, 294, 153, 154, 295, 164, 171, 312, 173, 177, 235, 180, 181, 186, 187, 190, 195, 199, 203, 209, 216, 217, 224, 243, 282, 285, 286

[56] References Cited

U.S. PATENT DOCUMENTS

| | | | |
|---|---|---|---|
| 5,164,825 | 11/1992 | Kobayashi et al. | 358/160 |
| 5,303,313 | 4/1994 | Mark et al. | 382/65 |
| 5,428,722 | 6/1995 | Marsh et al. | 395/133 |
| 5,493,639 | 2/1996 | Hirano et al. | 395/141 |

FOREIGN PATENT DOCUMENTS

| | | | |
|---|---|---|---|
| 2-54495 | 12/1982 | Japan | G01N 21/88 |
| 63-3388 | 1/1988 | Japan | G06F 15/70 |
| 4-261259 | 9/1992 | Japan | H04N 1/04 |
| 4-336677 | 11/1992 | Japan | G06F 15/62 |

OTHER PUBLICATIONS

"Singular Value Decomposition" by Press et al., *Numerical Recipes in C—The Art of Scientific Computing*, Second Edition, Chapter 2.6, pp. 59–70 (No Date of Public. & No Publisher).

"General Linear Least Squares" by Press et al., *Numerical Recipes in C—The Art of Scientific Computing*, Second Edition, Chapter 15.4, pp. 671–681 (No Date of Public. & No Publisher).

*Primary Examiner*—Leo H. Boudreau
*Assistant Examiner*—Bijan Tadayon
*Attorney, Agent, or Firm*—Knoble & Yoshida LLC

[57] ABSTRACT

This is directed to a method and a system for efficiently performing an image input positional adjustment prior to image or character recognition for data entry into a computer system.

51 Claims, 14 Drawing Sheets

FIG. 12

INPUT IMAGE

| 注 | 文 | 票 | |
|---|---|---|---|
| 商品名 | ABC | | |
| 商品番号 | R-1 | | |
| 個数 | 1049 | | |
| 95 年 | 8 月 | 6 日 | |

FIG. 5

STANDARD IMAGE

| 注 | 文 | 票 | |
|---|---|---|---|
| 商品名 | | | |
| 商品番号 | | | |
| 個数 | | | |
| 年 | 月 | 日 | |

INPUT IMAGE PATTERNS

STANDARD IMAGE PATTERNS

STANDARD IMAGE MEMORY

| PATTERN NO. | STANDARD IMAGE PORTION | COORDINATES |
|---|---|---|
| 1 |  | ((884,279)-(998,458)) |
| 2 |  | ((1185,278)-(1318,455)) |
| 3 |  | ((1574,324)-(1688,457)) |
| 5 |  | ((838,485)-(950,598)) |
| 6 |  | ((828,679)-(951,898)) |
| 7 |  | ((995,677)-(1085,897)) |
| 8 |  | ((673,884)-(744,1065)) |
| 9 |  | ((746,883)-(836,1066)) |
| 10 |  | ((1001,1092)-(1153,1283)) |
| 11 |  | ((1368,1091)-(1538,1285)) |
| 12 |  | ((1987,1090)-(2098,1284)) |

EFFICIENT IMAGE POSITION CORRECTION SYSTEM AND METHOD

FIELD OF THE INVENTION

The current invention is generally related to a positional adjustment of an input image, and more particularly related to an image input positional adjustment prior to image or character recognition for data entry into a computer system.

BACKGROUND OF THE INVENTION

In electrically transmitting image data from an image-carrying medium, it is difficult to place the image-carrying medium such as a sheet of paper at a predetermined orientation with respect to a scanner of a data transmitting device. As a result of inaccurate placement of the image data, at a receiving end of the electronic transmission, the image data is rotated or misplaced. This misplacement of the image data is not only aesthetically unpleasant, but also causes a data entry problem if the transmitted image is used to generate a data entry signal for a computer system. For example, referring to FIG. 1A, a customer uses a predetermined standard data entry order form to order 100 units of a products A, 500 units of a product B and 1000 units of a product C. The customer faxes the above described order form, and as indicated by a dotted line a certain quantity such as 100 units is located at a predetermined position in the order form. However, according to this example, the order form is accidentally placed upon transmission. As a result, the received order form on an image carrying medium or the received order form image is at an angle as shown in FIG. 1B. Although an area as indicated in the dotted line is scanned for determining a quantity of the product A, an image of the numerical figures for the intended quantity is not located in the expected area due to the misplacement. To correct the above described problem, prior art attempts included the following approaches.

According to a first approach, Japanese Laid Publication 63-3388 discloses a positional correction method using template matching which gradually changes the position of a template with respect to an input image in the X and Y directions. At each position, a matching score is generated to reflect how close the input image portion matches the template. Based upon the matching scores at the various positions, a vector is determined for correcting the position of the input image.

According to a second approach, Japanese Patent 2-54495 discloses a positional correction method based upon bit or on-pixel counts in the X and Y directions. The number of on-bits in each row and column of an input image as well as a standard image respectively is counted. Based upon the comparison of these bit counts between the input image and the standard image, an amount of positional adjustments is determined. The above determined positional amount is to minimize the discrepancy in the bit count between the input image and the standard image.

According to a third approach Japanese Laid Publication 4-261259 discloses a rotational correction method. While one way of determining an amount of rotational discrepancy is a user input via a pointing device, another way is to automatically determine the discrepancy using a predetermined set of marks or location indicators in an input image and a standard image.

According to a fourth approach, Japanese Laid Publication 4-336677 discloses a correction method based upon corresponding points which are determined by an user input via a pointing device or are automatically determined in an input image and a standard image. Subsequently, input image areas are determine to include these corresponding points in the input image. To determine an amount of correction for placing the input image at a desirable position, the input image areas are moved with respect to those in the standard image for a best match.

The above described prior attempts are either computation intensive or require an additional predetermined marker on a data entry form. In the first and fourth approaches, an input image is variously positioned at a predetermined interval with respect to a standard image, and at each position, a computation-intensive pattern matching process is performed. Although the positional interval is adjusted to control the number of repetition, the larger the interval is, the less accurate the pattern matching process becomes.

As to the second approach, the accuracy of pattern matching is affected by rotation, enlargement of reduction of an input image. In addition, for the above described use of the data entry form, this pattern matching technique does not appear to accommodate the difference between an unfilled and filled forms.

Lastly, as to the third approach, an additional location marker is necessary for automatically determining an amount of correction. Such additional markers are generally undesirable since they occupy areas in the data entry form. In order to rely upon these location markers to determine an accurate amount of positional correction, a relatively large number of these markers is necessary.

For these above described and other reasons, the prior art attempts do not provide a satisfactory method or system for correcting the positional location of an input image which has been inputted via an image inputting device such as a scanner.

SUMMARY OF THE INVENTION

In order to solve the above and other problems, according to one aspect of the current invention, a method of generating standard image patterns of a predetermined standard image for a comparison with an input image for correcting a position of the input image so as to conform to a predetermined position of the predetermined standard image, includes: dividing the standard image into standard blocks, each of the standard blocks containing a portion of the standard image, the portion of the standard image defining a standard image portion and being surrounded by a minimal circumscribing rectangle; eliminating certain of the standard blocks according to a predetermined set of criteria so as to leave remaining standard blocks; and storing data indicative of each of the remaining standard blocks as the standard image patterns, the data for each of the standard image patterns including at least corresponding one of the standard image portion and position information with respect to the standard image.

According to a second aspect of the current invention, a method of correcting a position of an input image to conform to a predetermined position of the predetermined standard image, includes: dividing the standard image into standard blocks, each of the standard blocks containing a portion of the standard image which defines a standard image portion, each of the standard blocks being surrounded by a minimal circumscribing rectangle, standard data including at least a position of each of the standard blocks and the standard image portion; eliminating certain of the standard blocks according to a predetermined set of criteria so as to leave remaining standard blocks, the remaining standard blocks defining standard image patterns; dividing the input image into input blocks, each of the input blocks containing a portion of the input image which defines an input image portion, the input image portion being surrounded by the minimal circumscribing rectangle, input data including at least a position of each of the input blocks and the input image portion; matching the standard image patterns with the input blocks based upon the standard image portions and the input image portions so as to define matched standard image patterns and matched input blocks; and determining an amount of positional correction based upon the matched standard image patterns and the matched input blocks for positioning the input image at the predetermined position of the standard image.

According to a third aspect of the current invention, a system for generating standard image patterns of a predetermined standard image for a comparison with an input image for correcting a position of the input image so as to conform to a predetermined position of the predetermined standard image, includes: a standard image divider for dividing the standard image into standard blocks, each of the standard blocks containing a portion of the standard image, the portion of the standard image defining a standard image portion and being surrounded by a minimal circumscribing rectangle; a block eliminating unit connected to the standard image divider unit for eliminating certain of the standard blocks according to a predetermined set of criteria and leaving remaining standard blocks; and a standard image memory unit connected to the block eliminating unit for storing standard data indicative of each of the remaining standard blocks as the standard image patterns, the standard data for each of the standard image patterns including at least the standard image portion and position information with respect to the standard image.

According to a fourth aspect of the current invention, a data entry system based upon an image of data, includes: a standard image memory unit for storing standard image patterns and predetermined positions; an input image dividing unit for dividing the input image into input blocks, each of the input blocks containing a portion of the input image which defines an input image portion, the input image portions including images of a predetermined data entry form containing labels and entry data, each of the input image portions having a location and being surrounded by a minimal circumscribing rectangle; a matching unit connected to the input image dividing unit and the standard image memory unit for matching the input blocks with the standard image patterns and identifying matched standard image patterns and matched input blocks; an image correction unit connected to the matching unit for determining a positional correction amount based upon the matched standard image patterns and the matched input blocks and positioning the input image at the predetermined position of the standard image according to the positional correction amount; and a image conversion unit connected to the image correction unit for identifying the images for the entry data of the input image and converting the entry data image into a data entry signal for the data entry.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIGS. 5 and 6 respectively illustrate an examplary order form and its standard image patterns.

FIGS. 12 and 13 respectively illustrate an input image and the input blocks using the same order form as described in FIGS. 5 and 6.

DETAILED DESCRIPTION OF THE PREFERRED EMBODIMENT(S)

Figures 1A, 1B:
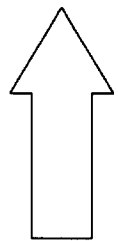
FIGS. 1A and 1B illustrate an order form is undesirably rotated during electronic transmission.
Figure 2:
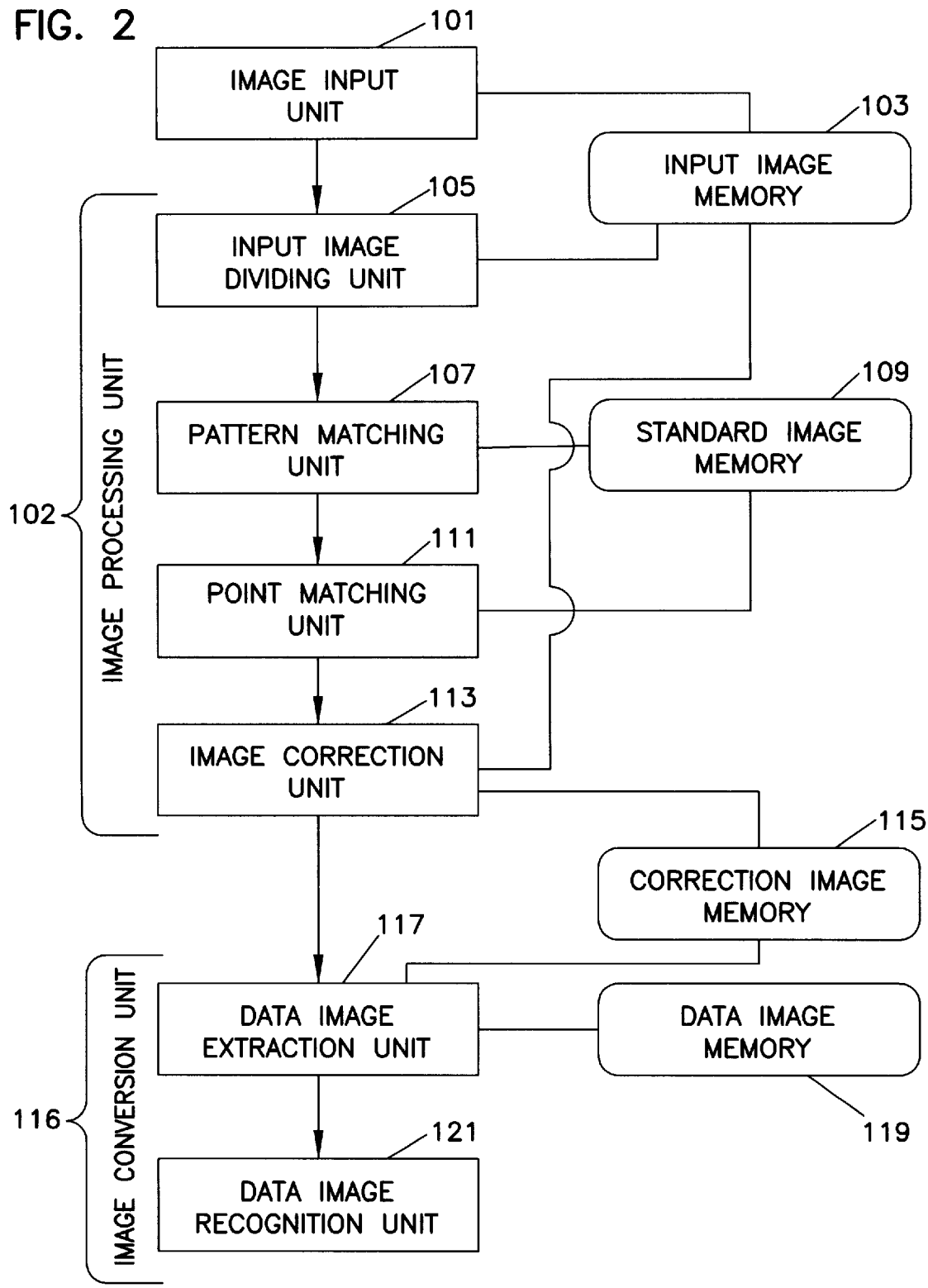
FIG. 2 diagramatically illustrates a system for efficiently adjusting a position of an input image.

Referring now to the drawings, wherein like reference numerals designate corresponding structure throughout the views, and referring in particular to FIG. 2, one preferred embodiment of the image correction system according to the current invention is diagrammatically illustrated. The image correction system may reside in an image duplication device such as a printer or an image transmission device such as a facsimile machine. Image data is inputted into an input image memory 103 via an image input unit 101. The image input unit 101 may be a scanner for converting an image on a image-carrying medium into an image signal or data. The image input unit 101 may also be a data receiving circuit which is connected to a data transmission line according to the current invention. The input image data is initially on an image-carrying medium such as a sheet of paper and includes data entry forms, order forms as well as other hard copies containing images of data or information. Generally, the data entry forms or order forms have labels or entry descriptions and the associated areas where corresponding data or information is placed.

Still referring to FIG. 2, an image processing unit 102 processes the input image data stored in the input image memory 103 in relation to a standard image data stored in a standard image memory 109. The image processing unit 102 includes an input image dividing unit 105, a pattern matching unit 107, a point matching unit 111 and an image correction unit 113. The input image dividing unit 105 divides the input image into input blocks, and each of the input blocks contains a portion of the input image or an input image portion as well as position information with respect to the input image. The pattern matching unit 107 matches a pattern or image of each of the input blocks with that of standard blocks which have been already stored in the standard image memory 109 prior to the image processing. These standard blocks are selected as standard image patterns, and each of the standard block contains an image portion of the standard image or a standard image portion as well as position information with respect to the standard image. Among the matched input blocks and standard blocks, the point matching unit 111 determines a corresponding pixel or point in each of the matched blocks. Finally, based upon the corresponding pixels, the image correction unit 113 determines a positional correction amount and corrects the positional discrepancy of the input image according to the positional correction amount so as to substantially conform to a predetermined position of the standard image. The above described image correction is performed either at a transmission side after the image has been scanned in or at a receiving side before outputting a print out or a display image.

After the above described correction, the positionally corrected input image data is stored in a correction image memory 115 and is further processed by an image conversion unit 116. The image conversion unit 116 includes a data image extraction unit 117 and a data image recognition unit 121. Conceptually speaking, the data image extraction unit 117 isolates a data image area which contains a data image based upon positional information stored in a data image memory 119. In other words, the data image extraction unit 117 inputs the data image to a data image recognition unit 121 which converts the data image to a data image signal. For example, if the data image contains the bit map data representing "123," the data image recognition unit coverts the image into a data signal representing a numeric data value 123.

Figure 3:
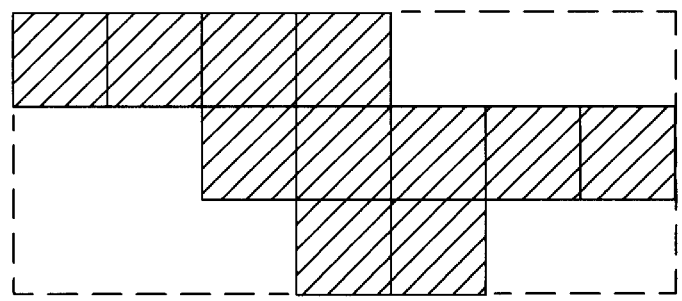
FIG. 3 illustrates an example of a minimal circumscribing rectangle.

Now referring to FIG. 3, the above described input image dividing unit divides an input image based upon a minimal circumscribing rectangle. The input image for the current invention generally has elements in a specific format, and each element has a predetermined position within the image. These elements include at least characters and numbers whose images are generated by a collection of small dots or pixels. The minimal circumscribing rectangle as shown in dotted lines encompasses contiguous dots or lines which generate at least a part of a character, a symbol or a number. Certain selected image portions as defined by the corresponding minimal circumscribing rectangles are used to ascertain a correct position and orientation of the input image. In order to determine the correct position and orientation of the input image, a predetermined position of each of the certain known image portions as well as the corresponding known image portion are selected prior to the determination. These selected elements are termed as standard image pattern, and the associated data is termed as standard image pattern data.

Figure 8:
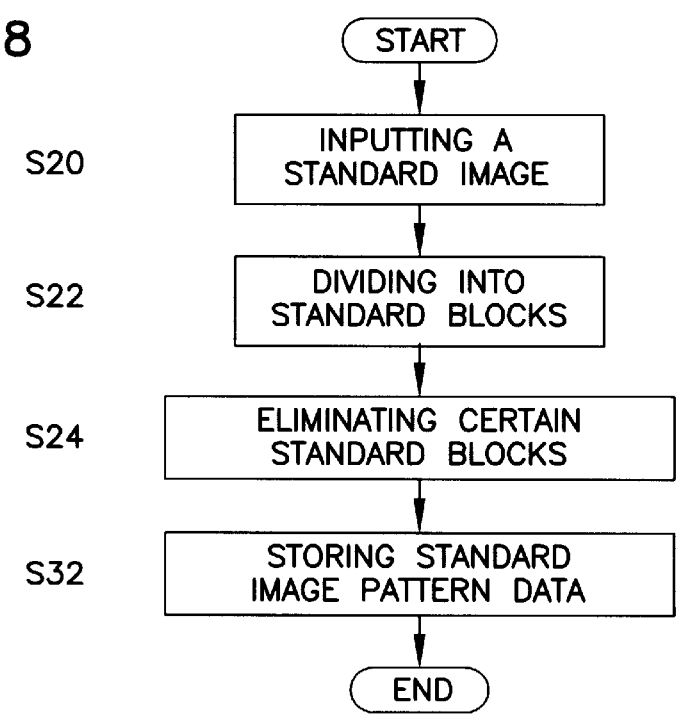
FIG. 8 is a flow chart illustrating steps involved in the generation of standard image patterns according to the current invention.
Figure 4:
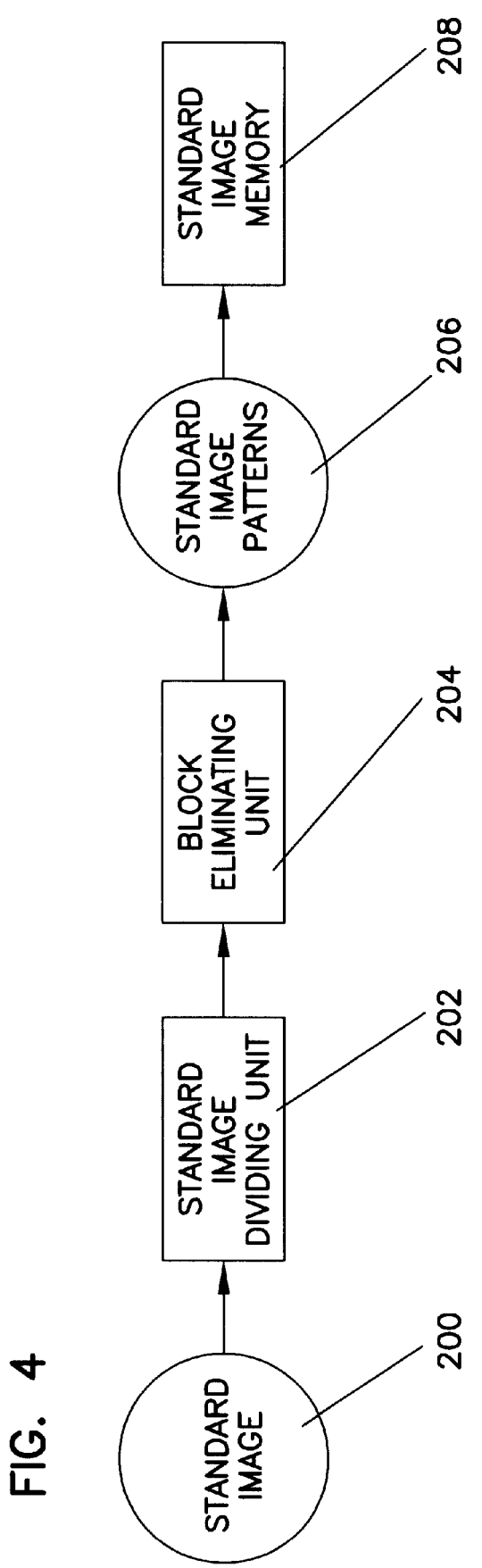
FIG. 4 diagramatically illustrates a sub-system for generating standard image patterns.

Referring to FIG. 4, one preferred embodiment of the system for creating the standard image patterns according to the current invention is diagrammatically illustrated. A standard image 200 such as a data entry form or an order form is inputted into a standard image dividing unit 202 in order to divide the standard image into standard blocks. Each of the standard blocks contains a portion of the standard image or a standard image portion and is defined by the above described minimal circumscribing rectangle. A block eliminating unit 204 eliminates certain standard blocks based upon a predetermined set of criteria. The criteria will be later described in details in relation to the operation of the system as illustrated in a flow chart as shown in FIG. 8. As the result of the elimination, the remaining standard blocks are selected as standard image patters 206, and the associated data is stored as standard data in the standard image memory 208. The standard data includes for each standard image pattern at least the standard image portion and positional information such as coordinates within the standard image.

Figure 6:
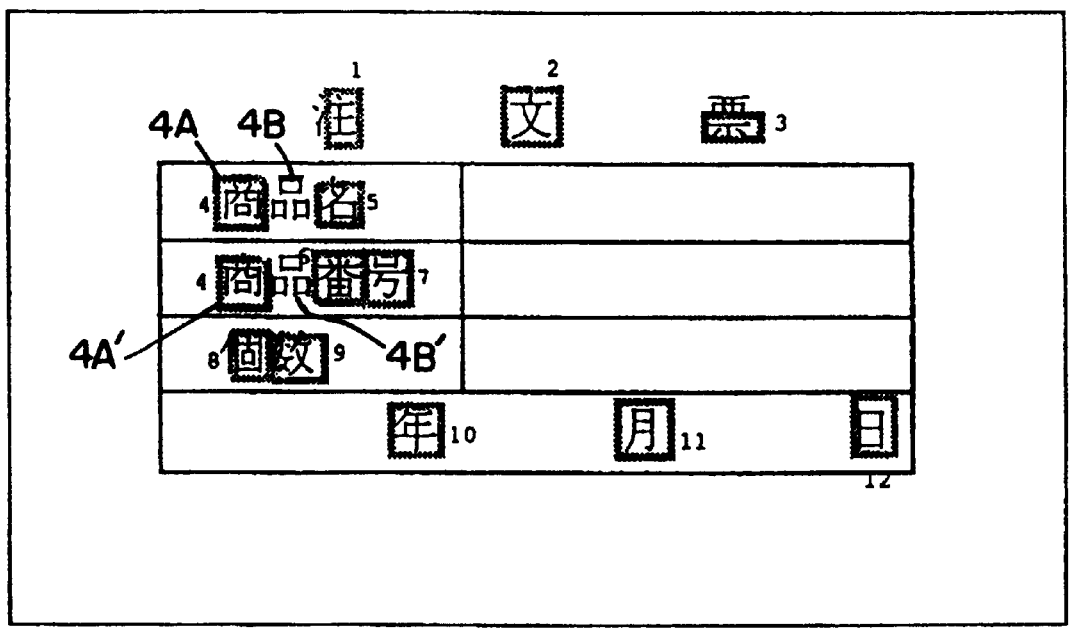

To further illustrate the above described standard image patterns, referring to FIGS. 5 and 6, one example of an order form in the Japanese language is illustrated as a standard image. FIG. 5 shows a blank original order form that is to be used for the purpose of electronically transmitting an order specifying a product name, a product number, a quantity and the date. This blank order form is used as a standard image or a known predetermined image for the transmission of a data image. Although this example is in the Japanese language, a method and a system for correcting the position of an input image according to the current invention is language neutral, and the inventive concepts of this example are applicable to any language.

Now referring to FIG. 6, standard blocks are each indicated by a minimal circumscribing rectangle and an associated number. To obtain the standard image patterns, the standard image is initially divided into the above described standard blocks as each defined by the minimal circumscribing rectangle. However, certain specified areas such 4B and 4B' of the standard image may be selectively specified in advance to be excluded from the generation of the standard blocks. Additionally, the size of the minimal circumscribing rectangle may be specified in a predetermined range. Subsequently, certain standard blocks are eliminated due to a predetermined set of criteria. For example, one of the predetermined criteria is a predetermined distance between the standard blocks which contain an identical image. Thus, the standard blocks 4A and 4A' are eliminated, and the remaining standard blocks are used as standard image patterns.

Figure 7:
FIG. 7 is standard data based upon the exemplary order form used in FIGS. 5 and 6.
Figure 7:
Figure 7:
Figure 7:
Figure 7:
Figure 7:
Figure 7:
Figure 7:
Figure 7:
Figure 7:
Figure 7:

Referring to FIG. 7, still using the above illustrated example in the Japanese language, the content of the standard image memory unit is illustrated. According to this exemplary standard image data, each standard image pattern has data indicative of a pattern number, a standard image portion and a pair of coordinates. These coordinates indicate the location of an upper left corner and a lower right corner of the minimal circumscribing rectangle in the standard image.

Figure 9:
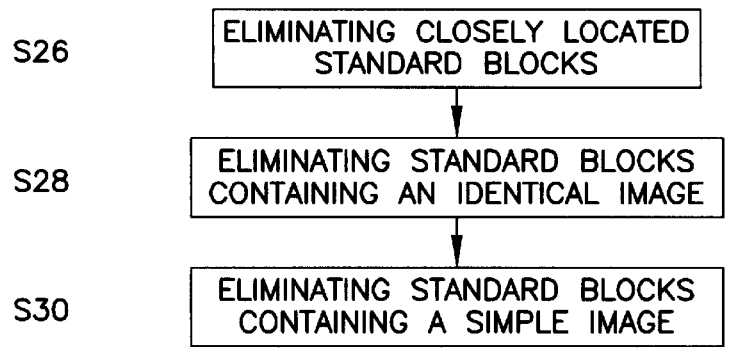
FIG. 9 is an examplary steps for eliminating certain standard blocks.

In order to more fully describe the process according to the current invention, referring to FIGS. 8 and 9, flow charts illustrate the steps involved in creating the above described standard image patterns. In general, a first flow chart in FIG. 8 illustrates steps involved in an overall flow of the creating standard image patterns while a second flow chart in FIG. 9 illustrates certain detailed steps to accomplish the process of eliminating certain standard blocks. Now referring to FIG. 8, an standard image such as an image of an order form is inputted in a step S 20. In a step S 22, the standard image is divided into portions or standard blocks each containing an image portion defined by the above described minimal circumscribing rectangle. These standard blocks are examined in a step S 24 in accordance with a set of predetermined criteria. If a standard block does not satisfy all of the predetermined criteria, the standard block does not qualify for a standard image pattern. In other words, the unqualified standard block is eliminated. Only qualified or remaining standard blocks are considered as standard image patterns. Data corresponding to each of these standard image patterns is stored for future reference in a step S 32.

Referring to FIG. 9, the above described eliminating step S 22 is further described. Although a partial flow chart in FIG. 9 illustrates three sequential steps, any combination of these and other steps allows to practice the current invention. In other words, these steps are merely exemplary and independent. In a step S 26, a distance between the adjacent standard blocks is considered. For example, if the distance between the center of two adjacent standard block is shorter than 512 pixels, these two adjacent standard blocks are eliminated from qualifying for standard image patterns. In a step S 28, similarly, standard blocks containing a substantially identical image portion are eliminated. In other words, each standard image pattern preferably should be unique. In general, a pattern matching is performed according to a method as described in "Numerical Recipes in C" by William H. Press et al. pp. 671–681. In a step S 30, standard blocks containing a simple image are also eliminated. The simple image is not often reliable since the image is confused with noise. One way to determine the simplicity of the image is to determine whether the following relation is met:

$$Nrun < Lr \times 12$$

where Nrun is a number of lines in the vertical and horizontal directions which is at least two-pixel long while Lr is a larger value between the length or width of the standard block containing the pattern.

Figure 10:
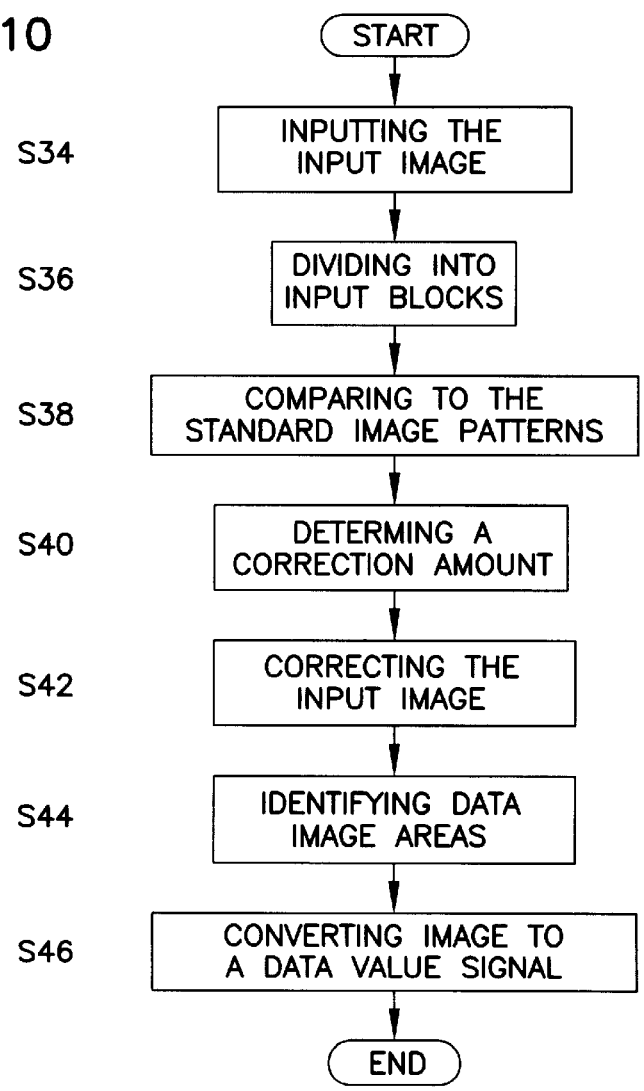
FIG. 10 is a flow chart for processing an input image using the standard iamge patterns generated by the steps described in FIGS. 8 and 9.

Now referring to FIG. 10, after the standard image patters have been established, an input image is processed to correct its position before the data image is converted into a data value signal. In a step S 34, using the identical entry data entry form, an input image is inputted, and the input image contains the same label image portions as the above described standard image and additionally include data image in data entry areas of the input image. In a step S 36, the input image is divided into input blocks in a substantially identical manner based upon the above described minimal circumscribing rectangles. The position of each of these input blocks is compared against that of the standard image patterns in a step S 38. If the position of the input block substantially matches that of one of the standard image patterns, the image itself is also compared. However, if the position or the size of the input blocks does not substantially match, the input block is considered to be not matched and no further process is pursued. The substantially matched input blocks and the corresponding standard image patterns are used to determine an amount of positional discrepancy of the input image in a step S 40. Based upon the above determined positional correction amount, the input image is corrected in a step S 42. In the corrected input image, data image areas are separated based upon the previously stored information in a step S 44. These data image areas each contain an image of the data to be recognized for data entry. The data image is generally a bit map representation of the alpha numeric values or characters. Finally, in a step S 46, the data image is converted into a data value signal.

Figure 11:
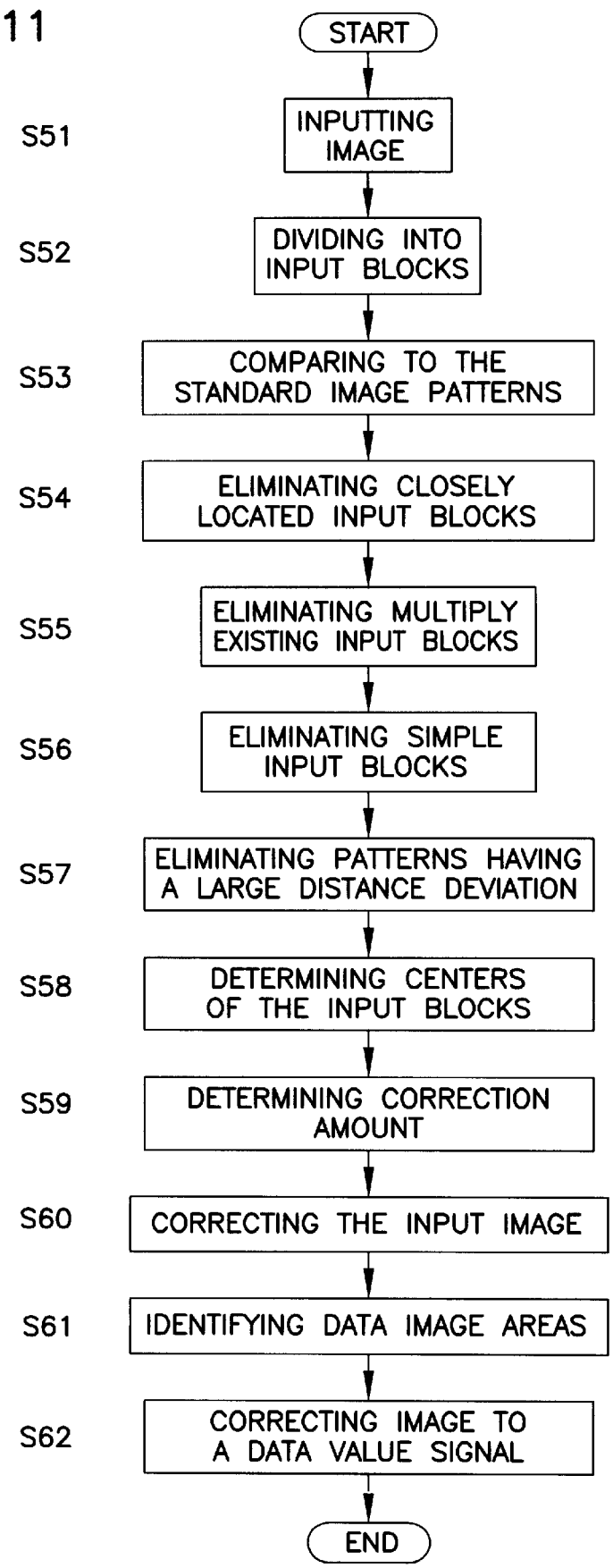
FIG. 11 is a flow chart illustrating another preferred process according to the current invention.

Referring to FIG. 11, another preferred process according to the current invention is illustrated. In this alternative process, the standard image patterns may be determined in a substantially identical manner as described in the steps illustrated in FIGS. 8 and 9. However, the determination of the standard image patterns is not necessarily critical, and standard blocks without eliminating any one of them may be used as standard image patterns in this alternative embodiment. In any case, these steps are not illustrated in FIG. 11. In a step S 51, an input image is inputted after standard image patterns are determined. As already described above, the input image contains a data image to be recognized. In a step S 52, the input image is divided into input blocks, and in a step S 53, each of the input blocks is compared to the standard image patterns as described before with reference to FIG. 10.

Still referring to FIG. 11, in steps S 54 through S 57, this alternative embodiment eliminates certain input blocks before determining a correctional amount for the input image. In general, these steps are comparable to those eliminating certain standard blocks as described in reference to FIG. 9. In a step S 54, adjacent input blocks that are located closer than a predetermined distance are eliminated. In a step S 55, multiple input blocks containing an identical image or pattern are also eliminated. In a step S 56, input blocks containing simple image patterns are removed. Lastly, input blocks whose center are deviated beyond a predetermined amount from that of the corresponding standard image pattern are also removed. Although the above steps for eliminating the input blocks are illustrated as a sequence, they are illustrative and any combination of these and other steps are used to eliminate undesirable input blocks. After certain input blocks are eliminated in the above steps S 54 through S 57, using the remaining input blocks, steps S 58 through S 62 in FIG. 11 are substantially identical to the steps S 40 through S 46 as described in reference to FIG. 10. To determine a correctional amount, an affine transformation is used. One example of the affine transformation is as follows:

$$\begin{pmatrix} Xi \\ Yi \end{pmatrix} = \begin{pmatrix} 0.999 & 0.044 \\ -0.444 & 0.999 \end{pmatrix} \begin{pmatrix} Xt \\ Yt \end{pmatrix} + \begin{pmatrix} 10.023 \\ -3.281 \end{pmatrix}$$

where (Xi, Yi) are coordinates prior to transformation while (Xt, Yt) are coordinates subsequent to the transformation. The affine transformation accounts for rotation, x-y positional correction as well as enlargement/reduction of the input image as disclosed in the U.S. Pat. No. 5,303,313.

Figure 13:
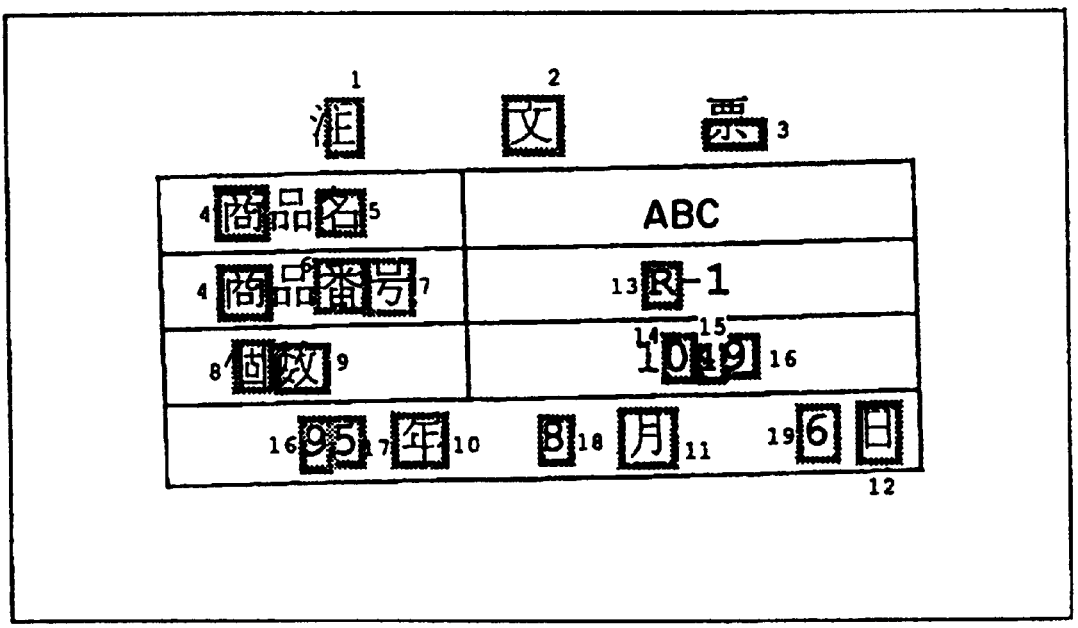
Figure 14:
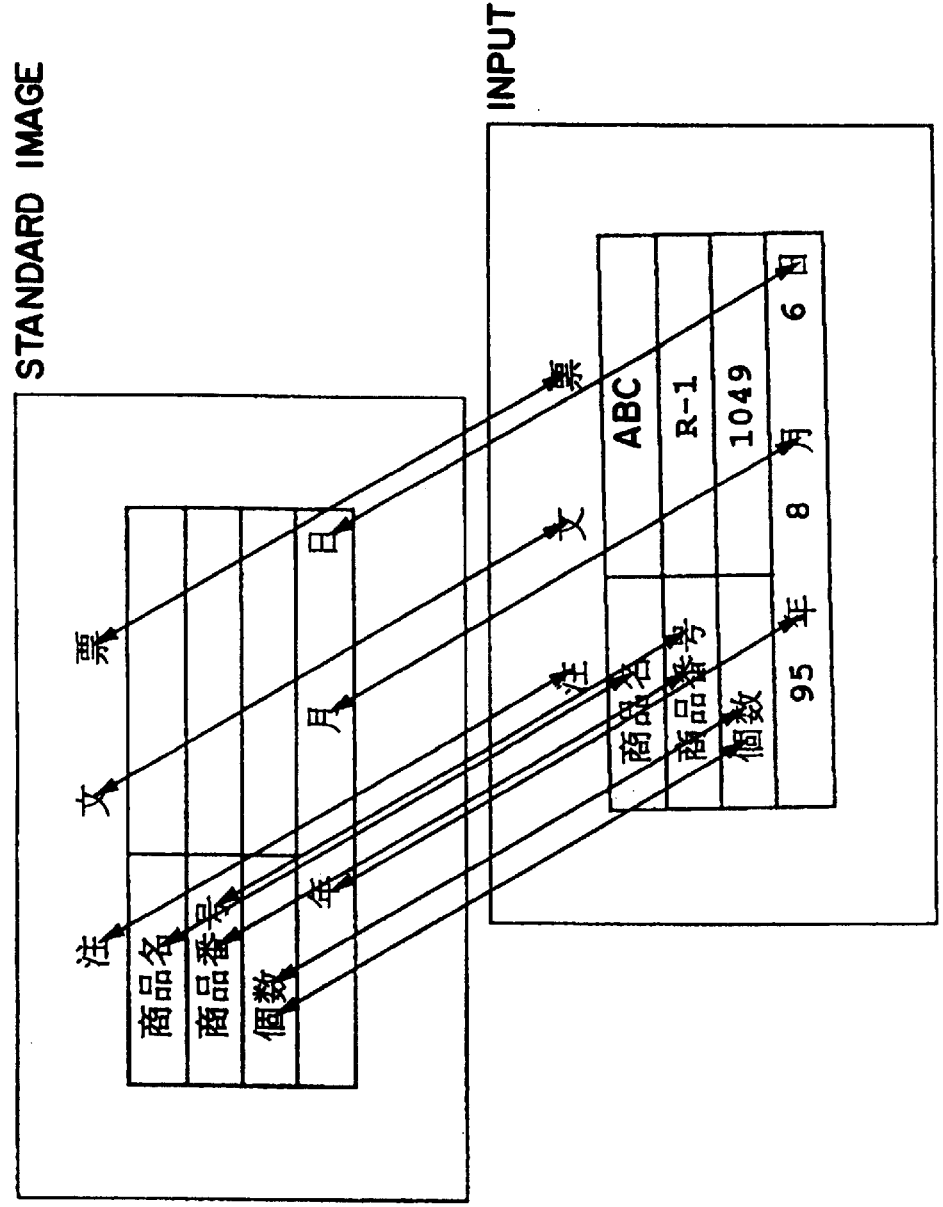
FIG. 14 illustrates the corresponding center points in the matched blocks between the input image and the standard image.
Figure 15:
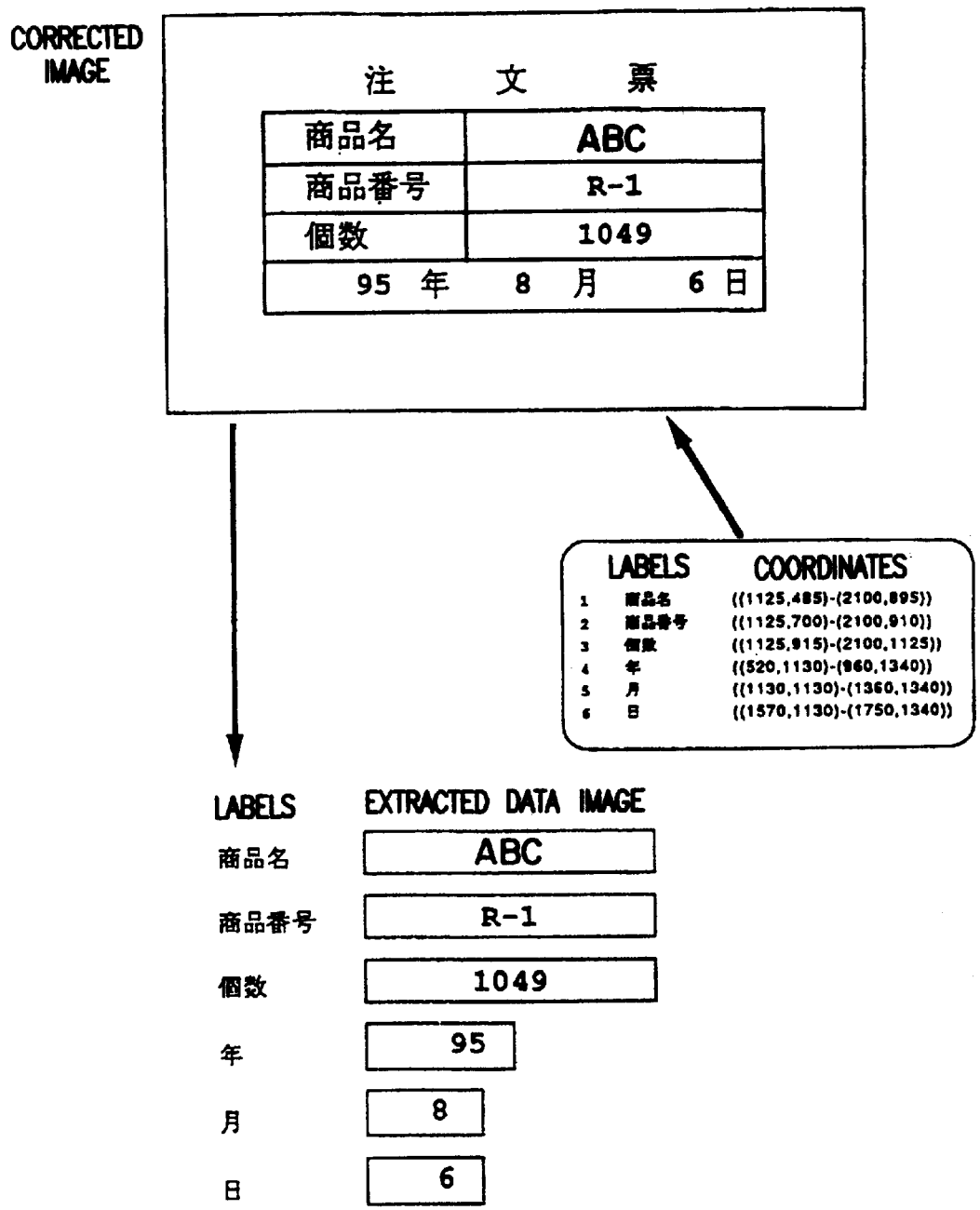
FIG. 15 illustrates a seguence of isolating image data areas.
Figure 16:
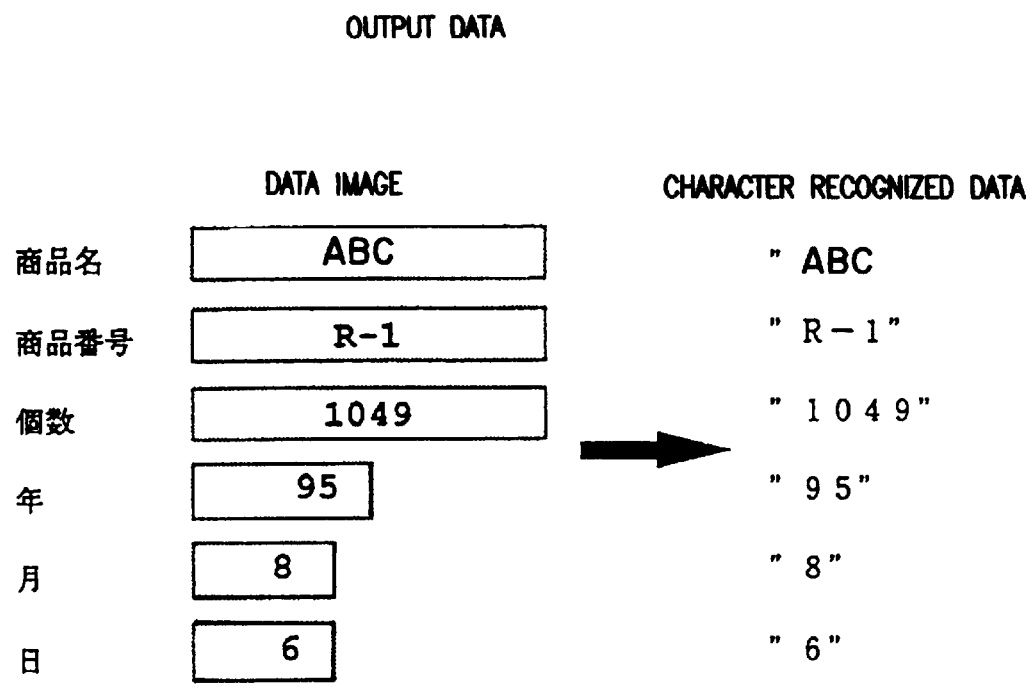
FIG. 16 illustrates a sequence of converting the image data into values.
Figure 17D:
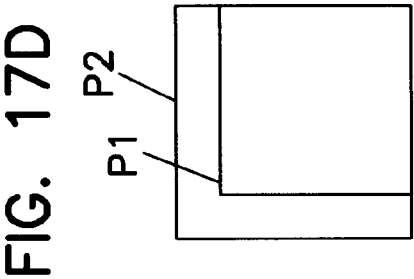
FIG. 17 diagramatically illustrates an alternative matching step.
Figure 17C:
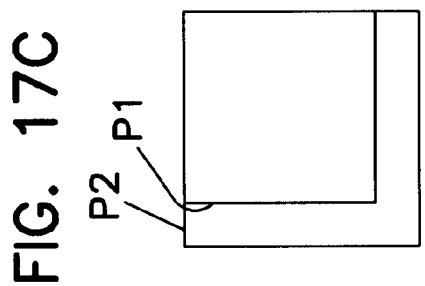
Figure 17B:
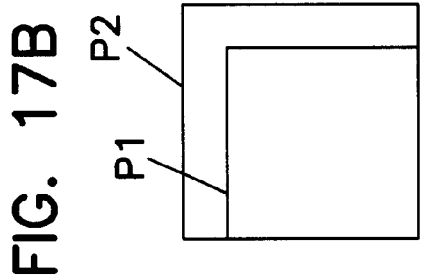
Figure 17A:
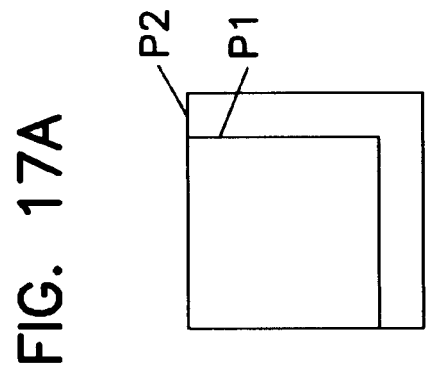

To further illustrate how the position of an input image is corrected and data image is converted into a data value, the same example data entry format is used. Referring to FIGS. 12 and 13, an input image includes label areas as already described in relation to a standard image and the associated image data. The image data includes "ABC" for the product name, "R-1" for the product number, "1049" for the quantity, "95" for the year, "8" for the month and "6" for the day. When the input image is divided into input blocks, some of the input blocks include the above data image areas as shown in FIG. 13. Referring to FIG. 14, after the corresponding blocks are matched, the center of each of the matched blocks between the input image and the standard image is indicated by a double headed arrow. Referring to FIG. 15, using the information on the coordinates of each label area, the data image areas containing data image are separated from the corrected input image. Finally referring to FIG. 16, the isolated data image are recognized and the corresponding a data value signal or data no are outputted. For example, a data image "R-1" is now converted into a data value of two.

Now referring to FIG. 17, an alternative process according to the current invention involves a matching step which allows some flexibility. In this alternative embodiment, even if the blocks do not substantially match in size, the image pattern comparison is performed by placing one block or a pattern P1 over the other pattern P2 at four different positions.

Figure 18:
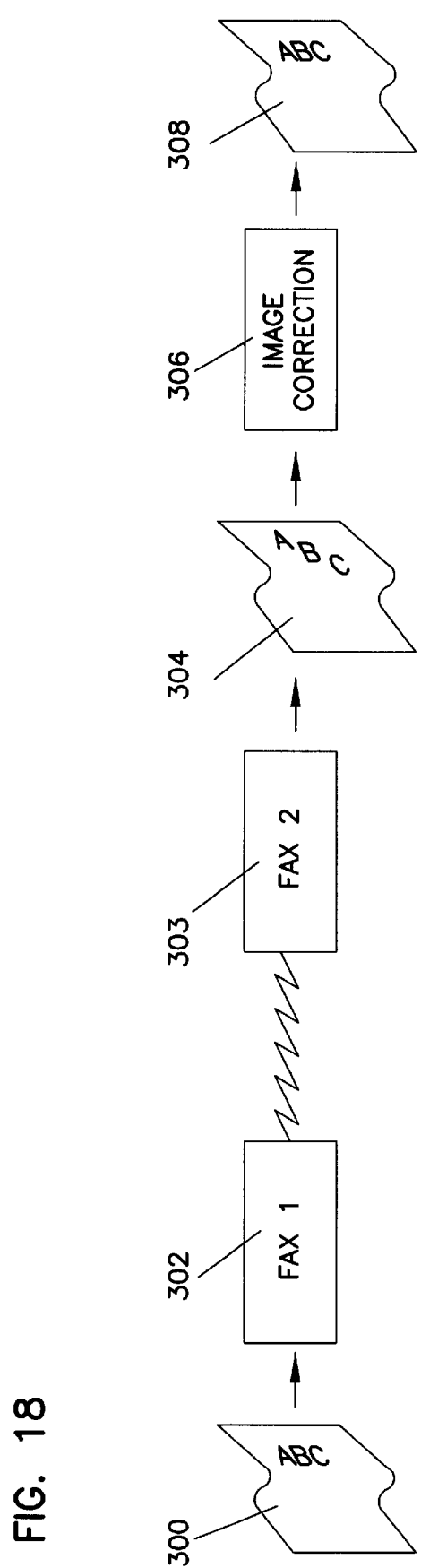
FIG. 18 diagramatically illustrates a second preferred embodiment of the system according to the current invention.

Referring to FIG. 18, one exemplary application of the above described system and method of the current invention is illustrated. An order form 300 on a sheet of paper containing a data image "ABC" is inputted into a transmitting facsimile machine 302. The sheet of the order form is misplaced for scanning in the facsimile machine 302. At a receiving facsimile machine 303, the data image is reproduced on a second image-carrying medium 304, and the image data "ABC" is rotated. After the reproduced image is inputted into a system 306 for correcting the image according to the current invention, the rotated image is corrected and the corrected image is finally rendered on a third image-carrying medium 308. The data image on the third image-carrying medium is now used for a character recognition to covert the data image into a data value. According to one preferred embodiment, the above described image correction unit 306 is incorporated into the transmitting fax machine 302. According to another preferred embodiment, the above described image correction unit 306 is incorporated into the receiving fax machine 303.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts, as well as implementation in software, hardware, or a combination of both within the principles of the invention to the full extent indicated by the broad general meaning of the terms in which the appended claims are expressed.

What is claimed is:

1. A method of generating standard image patterns of a predetermined standard image for a comparison with an input image for correcting a position of the input image so as to conform to a predetermined position of the predetermined standard image, comprising:

a) dividing the standard image into standard blocks, each of said standard blocks containing a portion of the standard image, said portion of the standard image defining a standard image portion and being surrounded by a minimal circumscribing rectangle;

b) eliminating certain of said standard blocks according to a predetermined set of criteria so as to leave remaining standard blocks; and c) storing data indicative of each of said remaining standard blocks as the standard image patterns, said data for each of the standard image patterns including at least corresponding one of said standard image portion and position information with respect to the standard image.

2. The method of generating standard image patterns according to claim 1 wherein said predetermined set of criteria includes a distance between said standard blocks which contain an identical image.

3. The method of generating standard image patterns according to claim 1 wherein said predetermined set of criteria includes a number of said standard blocks which contain an identical image.

4. The method of generating standard image patterns according to claim 1 wherein said predetermined set of criteria includes a number of on-pixels in each of said standard blocks.

5. The method of generating standard image patterns according to claim 1 wherein said predetermined set of criteria includes a selected combination of said standard blocks.

6. The method of generating standard image patterns according to claim 5 wherein said selected combination of said standard blocks is located adjacent with each other.

7. The method of generating standard image patterns according to claim 1 further comprising:

d) dividing the input image into input blocks, each of said input blocks containing a portion of the input image which defines an input image portion, each of said input blocks being surrounded by said minimal circumscribing rectangle, input data including at least a position of each of said input blocks and said input image portion;

e) matching said standard image patterns with said input blocks based upon said standard image portions and said input image portions so as to define matched standard image patterns and matched input blocks; and f) determining an amount of positional correction based upon said matched standard image patterns and said matched input blocks for positioning the input image at the predetermined position of the standard image.

8. A method of correcting a position of a first image to conform to a predetermined position of a second image, comprising:

a) dividing the second image into second blocks, each of said second blocks containing a portion of the second image which defines a second image portion, each of said second blocks being surrounded by a minimal circumscribing rectangle, second data including at least a position of each of said second blocks and said second image portion;

b) eliminating any of said second blocks according to a predetermined set of criteria so as to leave remaining second blocks, said remaining second blocks defining second image patterns;

c) dividing the first image into first blocks, each of said first blocks containing a portion of the first image which defines a first image portion, said first image portion being surrounded by said minimal circumscribing rectangle, first data including at least a position of each of said first blocks and said first image portion;

d) matching said second image patterns with said first blocks based upon said second image portions and said first image portions so as to define matched second image patterns and matched first blocks; and e) determining an amount of positional correction based upon said matched second image patterns and said matched first blocks for positioning the first image at the predetermined position of the second image.

9. The method of correcting a position of a first image according to claim 8 wherein said predetermined set of criteria includes a distance between said second blocks which contain an identical image in the second image.

10. The method of correcting a position of a first image according to claim 8 wherein said predetermined set of criteria includes a number of said blocks which contain an identical image in the second image.

11. The method of correcting a position of a first image according to claim 8 wherein said predetermined set of criteria includes a number of on-pixels in each of said second blocks.

12. The method of correcting a position of a first image according to claim 8 wherein said predetermined set of criteria includes a selected combination of said second blocks.

13. The method of correcting a position of a first image according to claim 8 wherein said amount of said positional correction is determined by using an affine transformation.

14. The method of correcting a position of a first image according to claim 8 wherein the first image is a predetermined data entry form containing labels and associated data on a first hard copy.

15. The method of correcting a position of a first image according to claim 14 wherein said data entry form is electronically scanned and transmitted from a first location to a second location.

16. The method of correcting a position of a first image according to claim 15 wherein said transmitted data entry form is correctly positioned at said predetermined position based upon said determined amount of said positional correction.

17. The method of correcting a position of a first image according to claim 16 wherein said data on said correctly positioned transmitted data entry form is converted into a data entry signal.

18. The method of correcting a position of a first image according to claim 15 wherein said transmitted data entry form at said second location is printed on a second hard copy prior to correcting the position.

19. The method of correcting a position of a first image according to claim 18 wherein said second hard copy is scanned to electronically form the first image, said transmitted data entry form in the first image being correctly positioned at said predetermined position of said second image based upon said determined amount of said positional correction, said correctly positioned transmitted data entry form being printed on a third hard copy.

20. The method of correcting a position of a first image according to claim 19 wherein said data on said correctly positioned transmitted data entry form of said third hard copy is scanned and converted into a data entry signal.

21. A method of correcting a position of a first image to conform to a predetermined position of a second image, comprising:
  a) dividing the first image into first blocks, each of said first blocks containing a portion of the first image which defines a first image portion, each of said first blocks being surrounded by a minimal circumscribing rectangle, first data including at least a position of each of said first blocks and said first image portion;
  b) eliminating any of said first blocks according to a predetermined set of criteria so as to leave remaining first blocks, said remaining first blocks defining first image patterns;
  c) dividing the second image into second blocks, each of said second blocks containing a portion of the second image which defines a second image portion, said second image portion being surrounded by said minimal circumscribing rectangle, second data including at least a position of each of said second blocks and said second image portion;
  d) matching said first image patterns with said second blocks based upon said second image portions and said first image portions so as to define matched first image patterns and matched second blocks; and
  e) determining an amount of positional correction based upon said matched first image patterns and said matched second blocks for positioning the first image at the predetermined position of the second image.

22. The method of correcting a position of a first image according to claim 21 wherein said predetermined set of criteria includes a distance between said first blocks which contain an identical image in the first image.

23. The method of correcting a position of a first image according to claim 21 wherein said predetermined set of criteria includes a number of said first blocks which contain an identical image in the first image.

24. The method of correcting a position of a first image according to claim 21 wherein said predetermined set of criteria includes a number of on-pixels in each of said first blocks.

25. The method of correcting a position of a first image according to claim 21 wherein said predetermined set of criteria includes a selected combination of said first blocks.

26. The method of correcting a position of a first image according to claim 21 wherein said amount of said positional correction is determined by using an affine transformation.

27. The method of correcting a position of a first image according to claim 21 wherein the second image is a predetermined data entry form containing labels and associated data on a first hard copy.

28. The method of correcting a position of a first image according to claim 27 wherein said data entry form is electronically scanned and transmitted from a first location to a second location.

29. The method of correcting a position of a first image according to claim 28 wherein said transmitted data entry form is correctly positioned at said predetermined position based upon said determined amount of said positional correction.

30. The method of correcting a position of a first image according to claim 29 wherein said data on said correctly positioned transmitted data entry form is converted into a data entry signal.

31. The method of correcting a position of a first image according to claim 28 wherein said transmitted data entry form at said second location is printed on a second hard copy prior to correcting the position.

32. The method of correcting a position of a first image according to claim 31 wherein said second hard copy is scanned to electronically form the first image, said transmitted data entry form in the first image being correctly positioned at said predetermined position of said second image based upon said determined amount of said positional correction, said correctly positioned transmitted data entry form being printed on a third hard copy.

33. The method of correcting a position of a first image according to claim 32 wherein said data on said correctly positioned transmitted data entry form of said third hard copy is scanned and converted into a data entry signal.

34. A system for generating standard image patterns of a predetermined standard image for a comparison with an input image for correcting a position of the input image so as to conform to a predetermined position of the predetermined standard image, comprising:
  a standard image divider for dividing the standard image into standard blocks, each of said standard blocks containing a portion of the standard image, said portion of the standard image defining a standard image portion and being surrounded by a minimal circumscribing rectangle;
  a block eliminating unit connected to said standard image divider unit for eliminating certain of said standard blocks according to a predetermined set of criteria and leaving remaining standard blocks; and
  a standard image memory unit connected to said block eliminating unit for storing standard data indicative of each of said remaining standard blocks as the standard image patterns, said standard data for each of the standard image patterns including at least said standard image portion and position information with respect to the standard image.

35. The system for generating standard image patterns according to claim 34 wherein said block eliminating unit eliminates some of said standard blocks based upon a distance between said standard blocks which contain an identical image.

36. The system for generating standard image patterns according to claim 34 wherein said block eliminating unit eliminates some of said standard blocks based upon a number of said standard blocks which contain an identical image.

37. The system for generating standard image patterns according to claim 34 wherein said block eliminating unit eliminates some of said standard blocks based upon a number of on-pixels in each of said standard blocks.

38. The system for generating standard image patterns according to claim 34 wherein said block eliminating unit eliminates some of said standard blocks based upon a selected combination of said standard blocks.

39. The system for generating standard image patterns according to claim 34 further comprising:

an input image dividing unit for dividing the input image into input blocks, each of said input blocks containing a portion of the input image which defines an input image portion, each of said input blocks being surrounded by said minimal circumscribing rectangle, input data including at least said input image portion and position information on each of said input blocks with respect the input image;

a matching unit connected to said standard image memory unit and said input image dividing unit for matching said standard image patterns with said input blocks and identifying matched standard image patterns and matched input blocks; and an image correction unit connected to said matching unit for determining an amount of positional correction based upon said matched standard image patterns and said matched input blocks for positioning the input image at the predetermined position of the standard image.

40. The system for generating standard image patterns according to claim 39 wherein said matching unit further comprises:

a pattern matching unit for matching said standard image portions and said input image portions; and a point matching unit in response to said pattern matching unit for determining a corresponding pixel in each of said matched standard image portion and corresponding each of said matched input blocks which are matched by said pattern matching unit.

41. A data entry system based upon an image of data, comprising:

a standard image memory unit for storing standard image patterns and predetermined positions;

an input image dividing unit for dividing the input image into input blocks, each of said input blocks containing a portion of the input image which defines an input image portion, said input image portions including images of a predetermined data entry form containing labels and entry data, each of said input image portions having a location and being surrounded by a minimal circumscribing rectangle;

a matching unit connected to said input image dividing unit and said standard image memory unit for matching said input blocks with said standard image patterns and identifying matched standard image patterns and matched input blocks;

an image correction unit connected to said matching unit for determining a positional correction amount based upon said matched standard image patterns and said matched input blocks and positioning the input image at the predetermined position of the standard image according to said positional correction amount; and a image conversion unit connected to said image correction unit for identifying said images for said entry data of the input image and converting said entry data image into a data entry signal for the data entry.

42. The data entry system according to claim 41 further comprising:

a standard image divider for dividing a standard image into standard blocks, each of said standard blocks containing a portion of the standard image and having a predetermined position in the standard image, said portion of the standard image defining a standard image portion and being surrounded by said minimal circumscribing rectangle; and a block eliminating unit connected to said standard image divider unit for eliminating certain of said standard blocks according to a predetermined set of criteria and defining remaining standard blocks as standard image patterns.

43. The data entry system according to claim 42 wherein said block eliminating unit eliminates some of said standard blocks based upon a distance between said standard blocks which contain an identical image.

44. The data entry system according to claim 42 wherein said block eliminating unit eliminates some of said standard blocks based upon a number of said standard blocks which contain an identical image.

45. The data entry system according to claim 42 wherein said block eliminating unit eliminates some of said standard blocks based upon a number of on-pixels in each of said standard blocks.

46. The data entry system according to claim 42 wherein said block eliminating unit eliminates some of said standard blocks based upon a selected combination of said standard blocks.

47. The data entry system according to claim 41 wherein said image correction unit determines said amount of said positional correction based upon an affine transformation.

48. The data entry system according to claim 41 wherein the input image is initially on a first hard copy.

49. The data entry system according to claim 48 further comprises an input terminal unit located at a first location and ultimately connected to said input dividing unit located at a second location for electronically transmitting said data entry form from the first location to the second location.

50. The data entry system according to claim 48 further comprising:

an input terminal unit for electronically transmitting said data entry form;

a printer unit connected to said input terminal unit for printing said electronically transmitted data entry form on a second hard copy prior to correcting the position; and a scanner connected to said input image dividing unit for scanning said second hard copy back into the input image.

51. The data entry system according to claim 50 wherein said printer prints said correctly positioned transmitted data entry form on a third hard copy.

* * * * *